(No Model.)

H. M. AUERSWALD.
HORSE COLLAR FASTENER.

No. 435,721. Patented Sept. 2, 1890.

Witnesses:
George Lanenbury
Joseph E. Noll

Inventor:
Herman M. Auerswald

UNITED STATES PATENT OFFICE.

HERMAN M. AUERSWALD, OF ST. JOSEPH, MISSOURI.

HORSE-COLLAR FASTENER.

SPECIFICATION forming part of Letters Patent No. 435,721, dated September 2, 1890.

Application filed March 22, 1890. Serial No. 345,004. (No model.)

*To all whom it may concern:*

Be it known that I, HERMAN MAXMILLIAN AUERSWALD, a citizen of the United States, residing at St. Joseph, in the county of Buchanan and State of Missouri, have invented certain new and useful Improvements in Horse-Collar Fasteners; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in horse-collar fasteners, whereby a horse-collar may be automatically and securely fastened.

It consists of two plates of metal, which are so constructed that they may be automatically locked together, and are attached to the collar by means of rivets, screws, or bolts. This fastener will remain fastened whether the hames are on or not.

Figure 1:
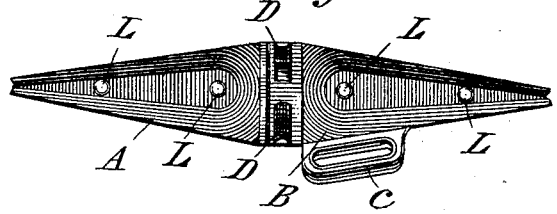
Figure 2:
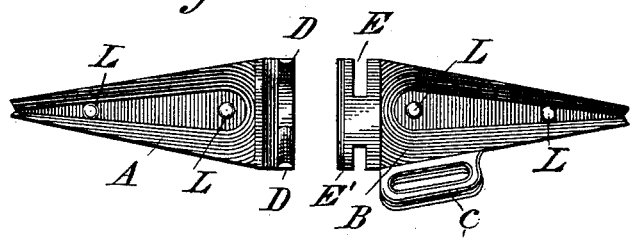
Figure 3:
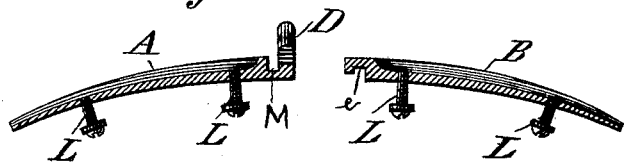
Figure 4:
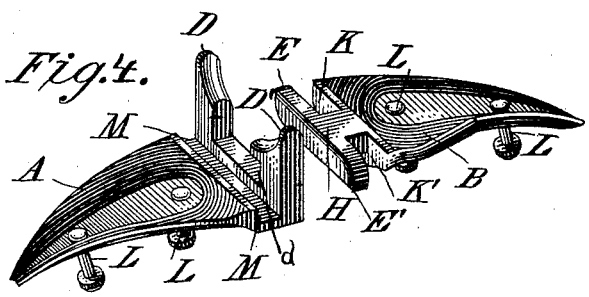

In the accompanying drawings, which form a part of this specification, Figure 1 is a top plan view of the fasteners locked together. Fig. 2 is a view of the fasteners as they would appear standing on edge, the fasteners being unlocked in this view. Fig. 3 is a central longitudinal section through the fasteners. Fig. 4 is a perspective view of the fasteners.

A and B are body portions of the two fasteners, provided with perforations through which are passed rivets, screws, or bolts L, by means of which the fasteners are secured to the collar.

C represents a loop on plate B, in which the martingale may be secured, if desired.

D and D' are two upright posts or guards, said posts or guards having a gradual incline from the top to or about the center of their bodies. The guard D' is also provided with a recess $d$, which will be hereinafter referred to.

Between the posts or guards D and D' and the body portion of the plate A is a slot or groove M. The guards or posts also serve to keep the hame-strap from slipping out of place.

The fastener-plate B is provided with a T-head of peculiar shape, the ends or projections E and E' being rounded, as shown in Fig. 4, the projection E' being much shorter than the projection E. The projections E and E' form recesses K and K'.

On the under side of the stem H of the T-head is a groove $e$.

The operation of securing the fasteners together is as follows: The T-head of fastener B is placed directly over the posts or guards D and D', the recess K' registering with the recess $d$ on post D'. The T-head is then shoved down in place, thus forcing the recesses K' and $d$ together and securely locking the fasteners together, the stem H passing in the recess $d$. The groove $e$ fits snugly over the raised portion between the posts D and D', thus enabling the projections E and E' to sink and fit snugly in the groove M. It is obvious that the weight of the collar (which is always down) will keep the fasteners securely locked together.

What I claim, and desire to secure by Letters Patent, is—

In a horse-collar fastener, the combination, with the plate A, provided with upright posts or guards secured thereon and having gradual inclined curved inner faces extending to the center of their bodies, and a recess $d$ in guard D', and groove M in plate A, of a plate B, having a T-shaped head secured thereon, and forming projections E and E', having rounded ends, the projection E' being shorter than projection E, and a groove $e$ on the under side of the stem of the T-head, substantially as described.

In testimony whereof I affix my signature in presence of two witnesses.

HERMAN M. AUERSWALD.

Witnesses:
 CHAS. F. ERNST,
 W. L. WHITTINGTON.